3 Sheets—Sheet 1.

F. BRAMER.
Wheel-Harrow.

No. 225,331. Patented Mar. 9, 1880.

WITNESSES

Wm A. Skinkle.
Geo. W. Breck.

INVENTOR

Frank Bramer.

By his Attorneys

Baldwin, Hopkins & Peyton

3 Sheets—Sheet 3.

F. BRAMER.
Wheel-Harrow.

No. 225,331. Patented Mar. 9, 1880.

WITNESSES
Wm. A. Skinkle.
Geo. W. Breck.

INVENTOR
Frank Bramer.
By his Attorneys
Baldwin, Hopkins & Peyton

UNITED STATES PATENT OFFICE.

FRANK BRAMER, OF LITTLE FALLS, NEW YORK.

WHEEL-HARROW.

SPECIFICATION forming part of Letters Patent No. 225,331, dated March 9, 1880.

Application filed December 29, 1879.

*To all whom it may concern:*

Be it known that I, FRANK BRAMER, of Little Falls, in the county of Herkimer and State of New York, have invented certain new and useful Improvements in Wheel-Harrows, of which the following is a specification.

In the present instance I have shown my invention as applied to wheel-harrows of the class having gangs of disks hinged or otherwise adjustably connected to an intermediate tongue, draft-frame, or connection, whereby the wheel or disk gangs are free to conform to the undulations of the surface over which they travel, as more especially exemplified in Letters Patent No. 174,767, granted March 14, 1876, to Bramer and Badger, and reissued February 12, 1878, No. 8,080, and in Letters Patent No. 205,608, granted to myself July 2, 1878, for wheel-harrows; but my invention may be applied to other forms of harrows of the class above mentioned, and also to harrows incapable of flexing or yielding to conform to undulations of the ground.

In the Letters Patent above mentioned the disk-gangs are shown as pivoted (intermediate of their length) to the outer ends of transverse bars or frames hinged, in turn, at their inner ends to an intermediate tongue, the gang bars or frames being adjustable on the transverse bars, and having the capacity of being held at their inner ends in this adjusted position by means of bolts or screws.

In both these patents the gang-bars are shown as pivoted on L-shaped frames, the arms of which are rigidly united at their point of junction, and are therefore incapable of adjustment relatively to each other or to the tongue, to which one arm of each transverse bar or frame is hinged.

The objects of my present invention are to obviate objections incident to such a construction as that above mentioned, and also so to organize the mechanism as to enable the driver (while in his seat on the machine and when the machine is in operation) to vary the angle of the disk gangs or bars relatively to the line of draft, which end I attain by connecting the disk-gang bars or frames with a slide operated by a lever.

The subject-matter claimed will be hereinafter specifically designated.

Figure 1:
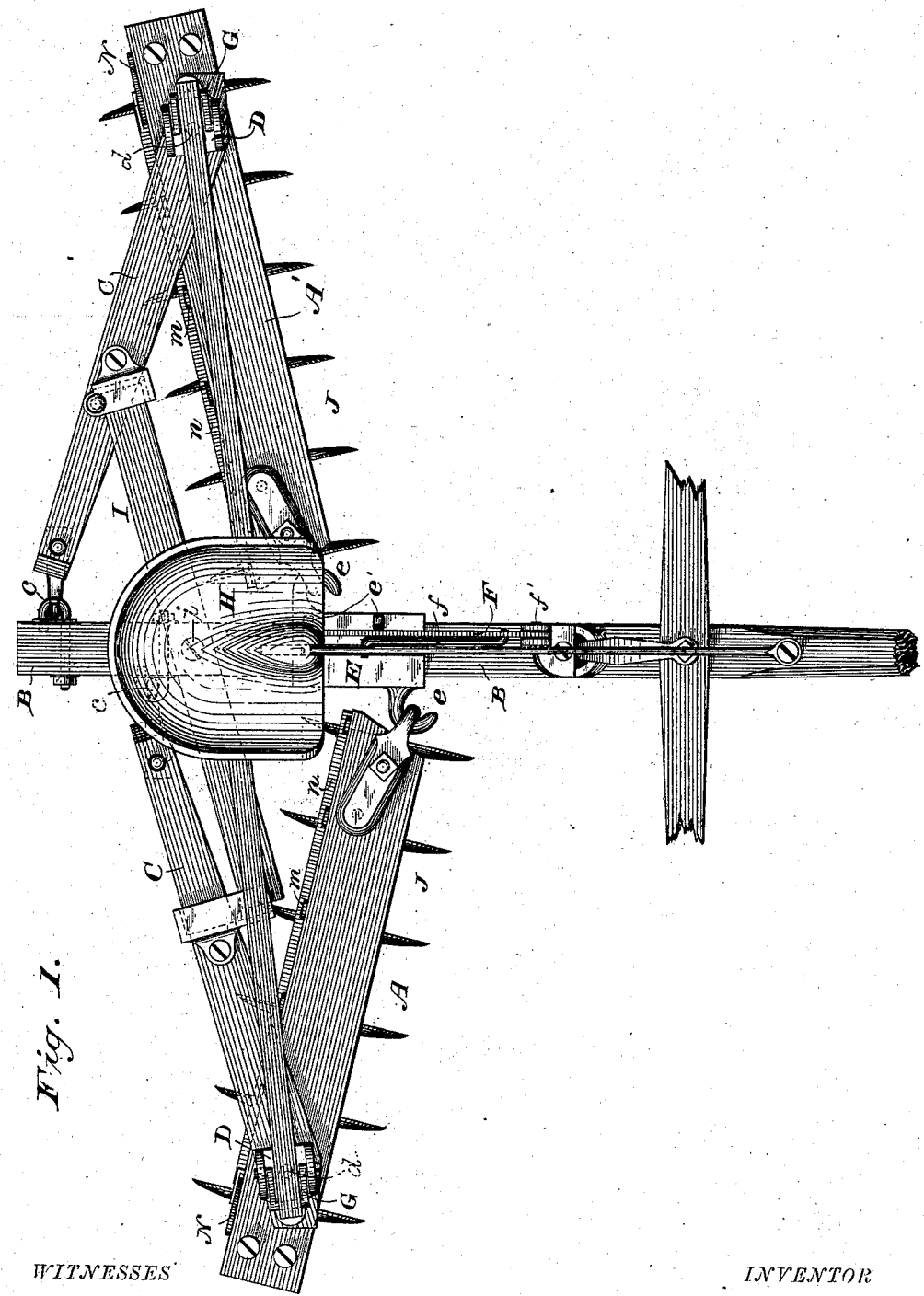
Figure 2:
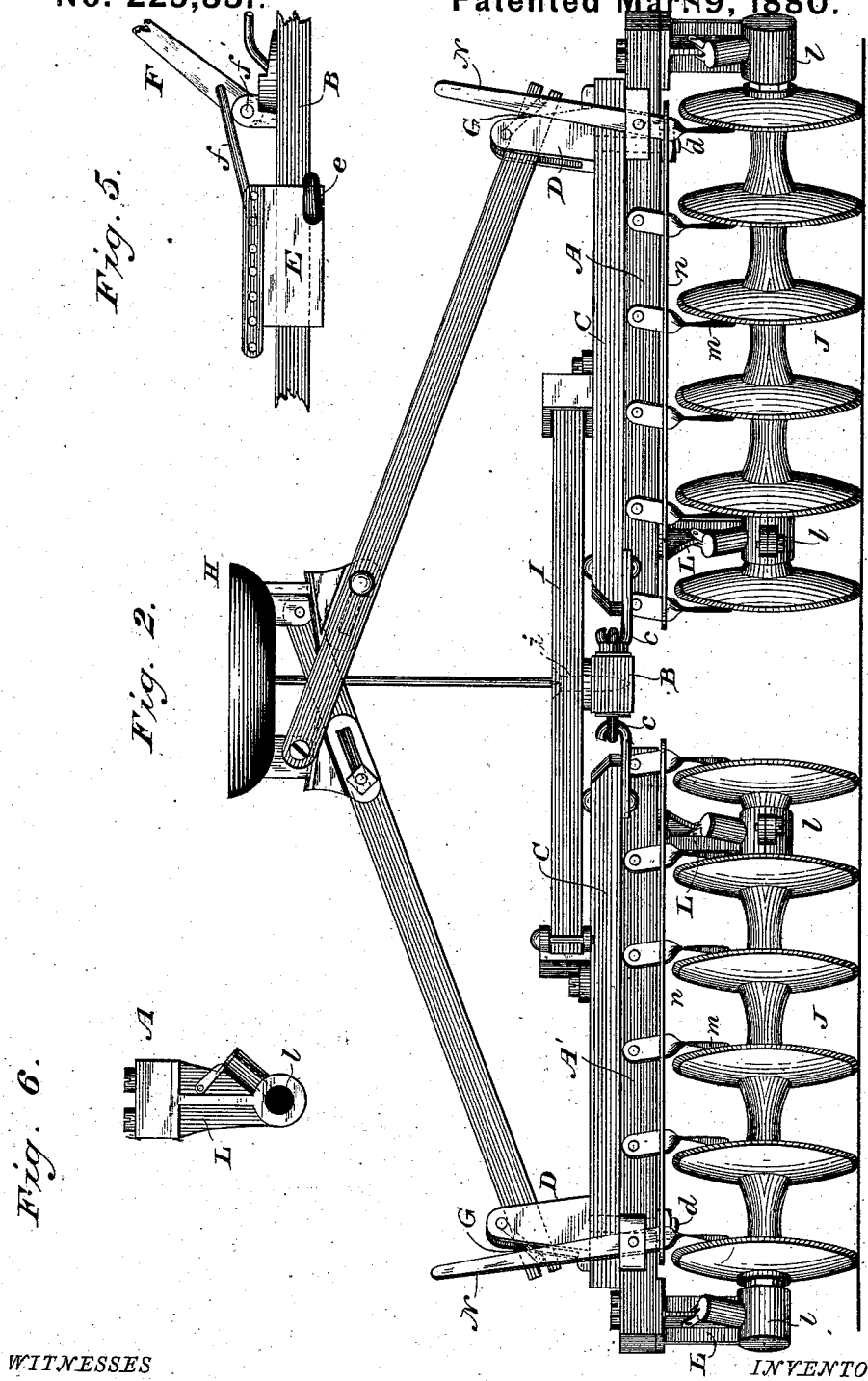
Figure 3:
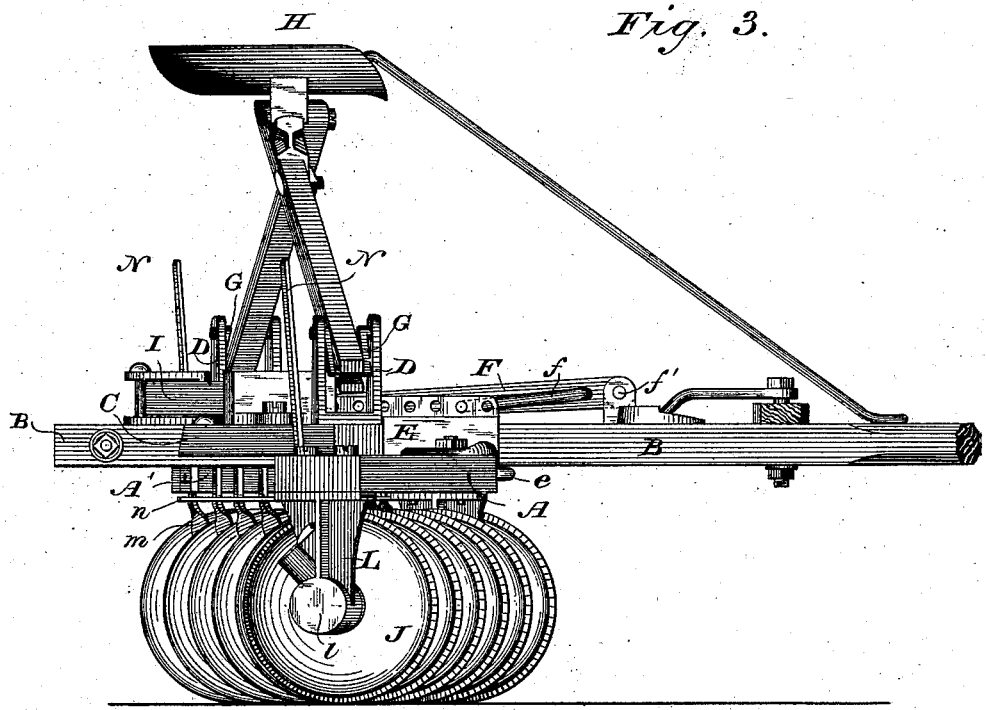
Figure 4:
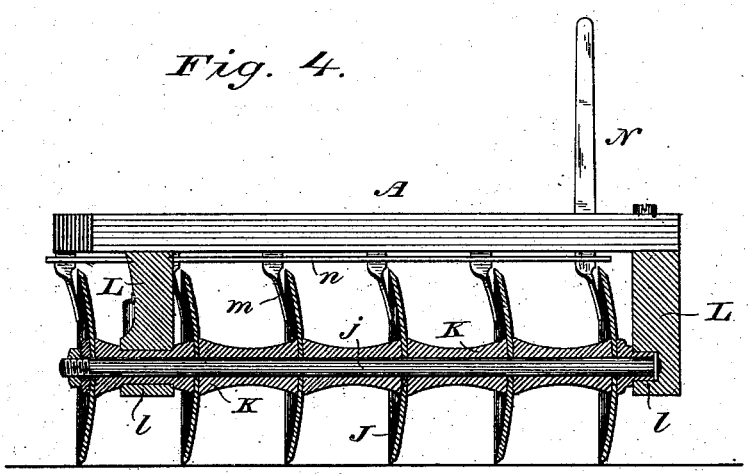

In the accompanying drawings, Figure 1 represents a plan or top view of a machine embodying my improvements in the best way now known to me; Fig. 2, a rear elevation thereof; Fig. 3, a side elevation thereof, and Fig. 4 a vertical longitudinal central section through one of the disk-gangs. Figs. 5 and 6 are detail views.

A detailed description of my improved machine is unnecessary in view of the patents hereinbefore cited. Consequently the details of the machine will not be specifically described herein, except where they differ from the construction shown in those patents.

The gang bars or frames A A' are shown as of symmetrical shape, and are connected with an intermediate tongue, frame, or draft-connection, B, by hinges, pivots, or joints of any suitable well-known construction, to permit the gangs to vibrate freely and conform to undulations in the ground over which they are moving, each irrespective of the other.

The gang-frame in this instance is shown as connected with the rear end of the tongue by a hook-and-eye joint, $c$, (or other suitable hinge-connection,) on an arm, C, connected with its respective gang-bar A near its outer end by the pivot-bolt $d$ of a stirrup, D. The tongue and arms C constitute a frame, relatively to which the disk-gang bars are adjusted. The inner end of each gang-bar is connected with the tongue or draft-frame by a similar hook-and-eye joint, $e$, (or other suitable hinge-connection,) mounted on a slide, consisting, in this instance, of a collar, sleeve, or thimble, E, capable of moving freely backward and forward on its supports, and connected by a link, $f$, with a lever, F, rocking on a pivot, $f'$, on the tongue. The handle of this lever is within easy reach of the driver when in his seat H on the machine.

The range of adjustment of the inner ends of the gang-bars can be regulated by means of a hook on the link $f$ taking into a series of holes on the sliding sleeve, or by means of a slot and set-screw, as usual. The lever may also be provided with a suitable ratchet and detent, of well-known construction, to lock it in any desired position, or it may be locked in its backward position by turning it down until the lever rests upon the sliding sleeve, in which position the lever and link *f* are in the same line, and the parts lock like a toggle-joint. The lever may be held in suitable guides or supports on the sliding sleeve, lugs *e'* being shown in this instance to prevent the lateral escape of the lever when resting on said sleeve.

The driver's seat H, as shown, is pivoted upon adjustable supports G, pivoted in the stirrups D, above mentioned.

The hinge-joints or pivots of the gangs may be rendered rigid, when desired, by means of a locking-bar, I, turning on a pivot, *i*, on the tongue, as shown in my patent above mentioned.

The disks J may be of any of the usual forms, and may be connected with the gang-bars in various well-known ways. They are shown in the drawings as of concavo-convex form, and as mounted on a through-axle, *j*, carrying interposed thimbles K. The axle or its proper thimbles are shown as mounted in suitable bearings 1 in rigid down-hangers or standards L, secured to the gang bars or frames.

Scrapers *m* are shown as pivoted separately on their respective gang-bars, and as controlled by a link, *n*, and lever N, as shown in Letters Patent No. 171,092, granted to me December 14, 1875, reissued June 25, 1876, as No. 8,299.

The operation of the machine will readily be understood from the foregoing description.

The connecting-arms C, it will be observed, are connected with the tongue, one slightly in advance of the other, and the gang-bars are correspondingly hinged to the sliding collar, thus constituting a sort of lazy-tongs or toggle-joint connection, the stationary point or fulcrum of which is the rear connection with the tongue. Owing to this organization the pivot-connection of the gang-bars and their connecting-arms C, or, in other words, the outer ends of the gang-bars, move backward or forward correspondently with the similar movements of the sliding collar or inner ends of the gang-bars, and the movements are thus compensated.

I do not, however, broadly claim herein adjusting the angle of gang-bars to the line of draft, that having been done in various well-known ways before the date of my invention; but, so far as my knowledge extends, the organization by which I attain that result is new.

I claim as of my own invention—

1. The combination, substantially as hereinbefore set forth, of a slide having the capacity of moving freely in the line of draft, a bar or support upon which said slide moves, disk-gang bars, a frame, pivot-connections between said frame and disk-gang bars at or near the outer ends of said bars, and the pivot-connections between the slide and the inner ends of said bars, whereby the angle of the disks relatively to the line of draft may be varied.

2. The combination, substantially as hereinbefore set forth, of the tongue, the slide moving freely longitudinally thereon, mechanism, substantially such as described, for locking the slide in any desired position, disk-gang bars, a frame, pivot-connections between said frame and bars at or near the outer ends of the bars, and pivot-connections between the slide and inner ends of said bars, whereby the disks may be adjusted as desired relatively to the line of draft and locked in position.

3. The combination, substantially as hereinbefore set forth, of the tongue or draft-frame, the slide having the capacity of moving freely longitudinally thereon, the wheel or disk-gang bars or frames, their pivots or hinge-connections with the slide, the connecting-arms and their pivots or hinge-connections with the gang bars or frames and tongue.

In testimony whereof I have hereunto subscribed my name.

FRANK BRAMER.

Witnesses:
Wm. D. Baldwin,
Nellie L. Holmes.